United States Patent

[11] 3,574,407

[72] Inventor Howard E. Oathout
 Grendada, Miss.
[21] Appl. No. 835,071
[22] Filed June 20, 1969
[45] Patented Apr. 13, 1971
[73] Assignee North American Rockwell Corporation
 Pittsburgh, Pa.

[54] WHEEL COVER
 11 Claims, 6 Drawing Figs.
[52] U.S. Cl. .................................................. 301/37
[51] Int. Cl. ............................................... B60b 7/06
[50] Field of Search ........................................... 301/37, 108

[56] References Cited
 UNITED STATES PATENTS
2,698,203 12/1954 Landell ........................ 301/37
3,037,816 6/1962 Mulhern ....................... 301/37
3,199,921 8/1965 Boroday ....................... 301/37
3,425,747 2/1969 Alfes ........................... 301/37

Primary Examiner—Richard J. Johnson
Attorneys—George R. Powers and John R. Bronaugh ABSTRACT: A wheel cover for a conventional automotive wheel including an axially extending cylindrical mounting flange supporting a plurality of circumferentially extending metal tooth members formed to provide at each end a generally radially outwardly projecting sharp-pointed tooth engaging an axially extending generally cylindrical flange on the wheel rim, the central portion of each of the tooth members being bent at a large obtuse angle to provide two flat halves each being centrally tangential to the mounting flange and being secured thereto, the clearance between the tooth members and the mounting flange at either side of such points of tangency, in combination with width reducing cutouts preferably provided in the tooth members intermediate the points of tangency, permitting flexing and twisting of the tooth members to facilitate installation of the wheel cover on the wheel and prevent removal of the wheel cover.

PATENTED APR 13 1971  3,574,407
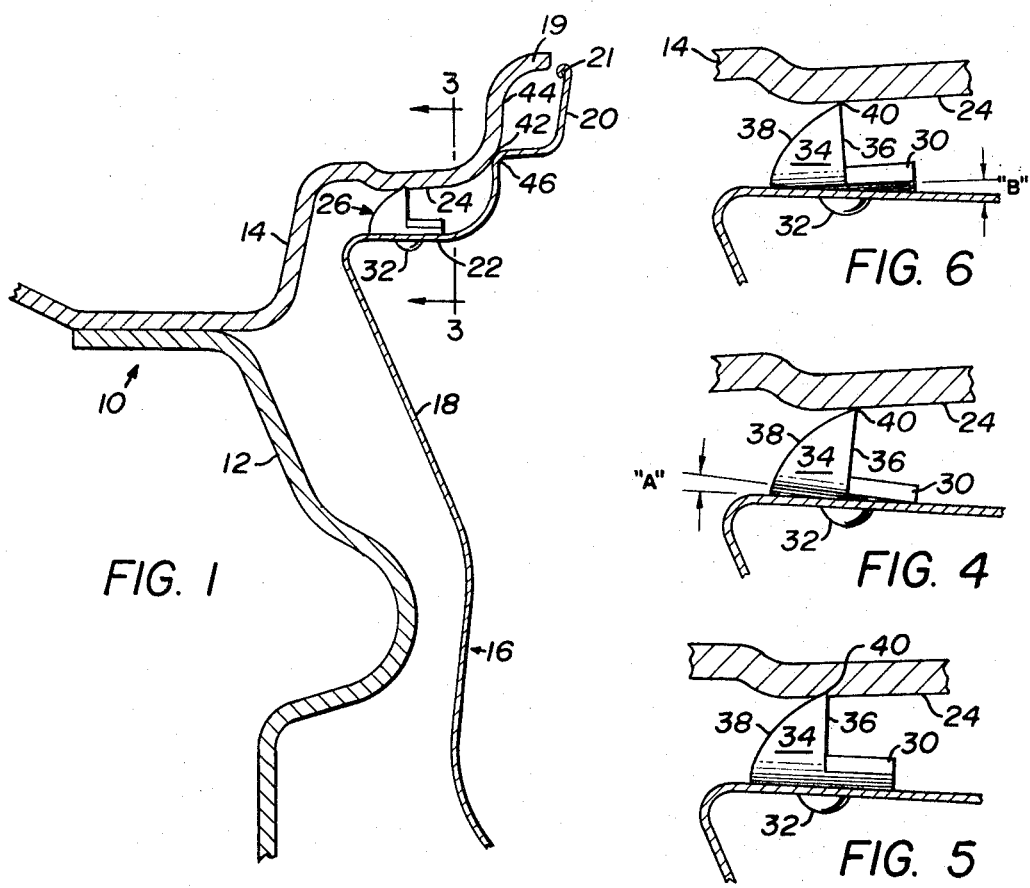
FIG. 1
FIG. 6
FIG. 4
FIG. 5
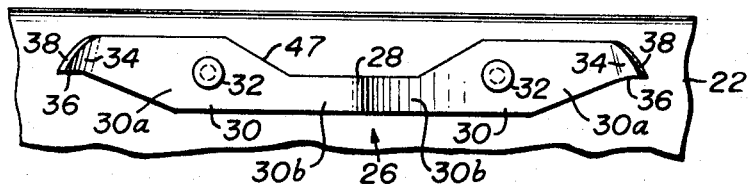
FIG. 2
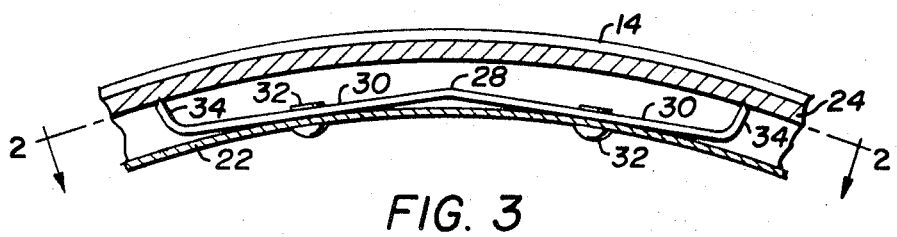
FIG. 3

WHEEL COVER

This invention relates to an automotive wheel cover having exceptionally effective means for retaining the wheel cover on a conventional multiflanged drop-center automotive wheel.

As is well known to those familiar with the art, the retention of a wheel cover on an automotive wheel involves substantial problems due to the shocks and strains which are encountered in normal driving and which tend to dislodge the wheel cover from the wheel. It is obvious, for example, that when the wheel strikes an obstruction in the road, or passes over a curbing or a hole in the rod, the abrupt deceleration of the wheel and the inertia of the wheel cover tend to cause the latter to separate from the wheel. Less apparent is the fact that even in straight line driving along a smooth road, a portion of the weight of the automobile is imposed against the bottom of each wheel, causing a slight flattening of that side of the wheel, imperceptible to the eye but of significant magnitude, and as the wheel rotates, the position of this flattened portion is continually moving around the circumference of the wheel. This flattening effect is aggravated when the wheel strikes an obstruction or even when the automobile turns a corner so that the weight is concentrated on the two outside wheels. Even more significantly, the transverse forces imposed on the tread of the tire, due to the inertia and the centrifugal force of the car as it turns, are transmitted through the tire to the rim of the wheel, twisting the wheel out of planar alignment. The wheel is subjected to still other complex stresses when the brakes are applied, and so on.

Providing a wheel cover having retention means capable of holding the wheel cover on the wheel against such shocks and distortions of the wheel obviously involves substantial problems.

Moreover, it is very important that the retention means not only prevent accidental outward movement of the wheel cover but also prevent rotation of the wheel cover relative to the wheel, not merely to keep the valve stem hole in the wheel cover aligned with the valve stem and, where the valve stem or valve stem extension projects through such hole, to prevent twisting or breakage of the stem or extension thereof, but also because relative rotation of the wheel cover will almost inevitably cause the wheel cover gradually to work its way off of the wheel.

Since it is often necessary to change a tire in an area remote from a service station, and under adverse conditions such as darkness, rain, cold and so on, it is important that the wheel cover be capable of being easily and properly applied by persons who are unskilled and inexperienced and have no instructions and no special tools or equipment. Since automotive prices are highly competitive, it is also important that all of the aforementioned characteristics be achieved in a wheel cover which is simple and economical in construction. Since automotive manufacturers are highly resistant to changes in the shape of the wheels merely to adapt them for cooperation with retaining means on the wheel covers, it is virtually imperative that the wheel cover retaining means be effective with standard wheel configurations. And, since styling is an extremely important factor in the selection of automobiles, it is also highly desirable that the wheel covers present an attractive appearance. Finally, in this day of quiet engines, transmissions, bodies and suspensions, it is important that the wheel cover be permanently rattle free under all anticipated conditions, both intrinsically and in its attachment to the wheel.

The present invention provides a wheel cover which satisfies all of the aforementioned objectives. The retention means of this invention includes a plurality of hard, springy metal tooth members having generally radially outwardly projecting teeth with sharp points which are resiliently maintained in firm, biting engagement with a flange of the wheel rim, the tooth members being secured to a cylindrical flange on the wheel cover by suitable means such as rivets at circumferentially spaced-apart points. The tooth members are so shaped and the mounting means are so located as to permit differential flexure and twisting of the tooth members and of the mounting flange and thus facilitate installation of the wheel covers without increasing the hazard of their accidental displacement from the wheel. By a further aspect of the invention, the entire wheel cover including the mounting flange may be formed from a single circular piece of sheet metal to provide a relatively low-cost construction.

In the drawing:

FIG. 1 is a fragmentary transverse sectional view through a conventional automotive wheel having mounted thereon a wheel cover embodying features of the present invention.

FIG. 2 is a fragmentary plan view of a portion of the mounting flange of the wheel cover on which one of the tooth members is mounted.

FIG. 3 is a section taken on the line 3–3 of FIG. 1.

FIGS. 4, 5 and 6 are enlarged fragmentary views of the structure shown in FIG. 1, respectively showing its several parts in the relative positions they assume, first when the wheel cover is pressed rearwardly (inwardly) into the wheel for mounting thereon, then when the wheel cover is at rest in fully mounted position on the wheel, and finally during forward (outward) movement of the wheel cover for removal from the wheel.

FIG. 1 shows the upper half of a conventional automotive wheel, generally designated 10, having a central, circular body portion or spider 12, with a multiflanged, drop-center rim 14 welded to its periphery. Mounted on the wheel is an illustrative wheel cover embodying features of the present invention, and consisting essentially of a circular disc 16 formed of a single sheet of metal, for example stainless steel, although the disc can also suitably be a molded synthetic resin. The sheet metal is die stamped to circular shape and die formed to provide a decorative surface 18, of which the particular conformation shown is intended as merely one illustrative example of an almost infinite variety of suitable shapes. The disc 16 includes an annular marginal skirt 20 extending around its periphery in closely spaced overlying and concealing relation to the lip 19 of the wheel rim 14. A narrow marginal portion of the skirt 20 is preferably folded back on itself to form a bead 21, which gives the wheel cover a smooth, rounded edge, and also reinforces and stiffens its periphery.

The disc is formed to provide also a generally cylindrical, generally axially extending concentric mounting flange 22 which is of such width and such diameter as to project into the wheel rim 14 in radial opposition with and slightly spaced from a generally axially extending, generally cylindrical flange 24 of the wheel rim 14.

Mounted at uniformly spaced positions around the mounting flange 22 are a plurality, for example four, circumferentially extending tooth members 26, each of which, as best shown in FIGS. 2 and 3, is formed of a single, elongated piece of sheet metal. Each tooth member 26 is centrally bent at a large obtuse angle, as shown at 28, to form two substantially flat halves 30, the central portion of each of which is tangential to the mounting flange 22. Each tooth member is secured to the mounting flange 22 by a pair of rivets 32, each extending through one of the halves 30 at its point of tangency to the mounting flange 22. The rivet heads, which are visible from the front of the cover, are finished similarly to the adjacent portions of the disc, to give the wheel cover an attractive appearance.

At the opposite ends of each tooth member, a short length of the tooth member is bent to form a generally radially outwardly projecting tooth 34. As best shown in FIGS. 4, 5 and 6, each tooth is shaped and arranged so that its forward edge 36 is substantially straight and extends substantially along the radial plane passing through the rivets 32 along the longitudinal axis of the tooth member. The rearward edge 38 of the tooth intersects the forward edge 36 at an acute angle to form a sharp point 40, the rearward edge 38 preferably being convexly curved in the manner illustrated by FIGS. 4—6.

When the teeth are in their normal relaxed condition on the unmounted wheel cover, all of the points 40 of the teeth 34 lie substantially along a common circle of such radius that, when the wheel cover is pressed rearwardly (inwardly) into the wheel for mounting, the inclined rearward edges 38 of the teeth engage the curved juncture 42 between the flange 24 and an adjoining, generally radially extending annular surface 44 of the wheel rim 14, camming the teeth radially inwardly to such extent that the points of the teeth will pass along the inner surface of the flange 24. Such radially inward movement of the points of the teeth is accommodated principally by radially inward resilient flexure of the outer portions 30a of the tooth members and to a lesser extent by rotation of the teeth and resilient twisting of such outer portions, as indicated by the angle "A" in FIG. 4, and by localized radially inward flexure of the mounting flange 22. Because of the aforementioned inclined disposition of the rearward edges 38 of the teeth, this slight rotation of the teeth reduces the contact angle between the rearward edges 38 of the teeth 34 and the wheel-rim flange 24, thereby reducing friction between them and facilitating installation of the wheel cover onto the wheel.

The rearward (inward) movement of the wheel cover is continued to the point where a concentric circular indented portion 46 of the disc between the skirt 20 and the mounting flange 22 abuts the aforementioned surface 42 of the wheel rim 14. The central portion of the disc and the mounting flange 22 are preferably pressed inward slightly beyond this point, with resulting relative outward resilient flexure of the skirt 20. Thus, when the mounting force is released and the outer portions 30a unwind to the position illustrated by FIG. 5, moving the flange 22 outwardly, the resilience of the disc will maintain the skirt 20 in firm engagement with the rim 14 at the circular portion 42 to prevent rattling of the wheel cover on the rim during driving of the vehicle.

The resilience of the tooth members 26 and of the mounting flange 22 keeps the sharp points 40 of the teeth in firmly compressive engagement with the wheel-rim flange 24 and, particularly during the vibration of the wheel encountered in driving, even causes the sharp points 40 to dig slightly into the flange 24, as shown in FIG. 5, locking the wheel cover securely on the wheel. Preferably, as shown by FIG. 3, the teeth 34 diverge slightly in the radially outward direction when the wheel cover is mounted on the wheel to provide resistance to rotation of the wheel cover on the wheel.

When it is desired to remove the wheel cover, for example to change a tire, a thin-bladed tool, such as a screwdriver, is inserted between the marginal bead 21 of the wheel cover and the lip 19 of the wheel rim 14 at several spaced points around the periphery of the wheel cover to pry it progressively off of the wheel. During such movement, the friction between the sharp points 40 of the teeth 34 and the wheel-rim flange 24 causes the end portions of the tooth members to be slightly twisted, as shown at B in FIG. 6, but the angle between the forward edges 36 of the teeth and the mounting flange 22 is such that accidental removal of the wheel cover from the wheel is strongly resisted.

As best shown in FIG. 2, the central portions 30b of each of the tooth members are provided with a cutout or indentation 46. The resulting reduction in the width of the central portions of the tooth members, in combination with the radial clearance between the mounting flange 22 and the portions 30a and 30b of the tooth members 26 at either side of the rivets 32, facilitates differential flexing and twisting of the tooth members 26 and the mounting flange 22, and thus contributes to easy installation of the wheel covers without an unacceptable increase in the hazard of accidental removal.

The fact that the tooth members 26 are formed separately from the remainder of the wheel not only allows the tooth members to be formed of thicker material, so that the teeth 34 can be very strong and very stiff, but also allows them to be formed of a different type of material. Thus the tooth members may be formed, for example, of a hardened steel so that the points of the teeth will remain sharp after repeated installation and removal of the wheel covers, and the tooth members will have excellent spring characteristics and will not lose their resilience or take a permanent set. The disc 16, on the other hand, may be formed of a somewhat softer metal which is easier to die form, or, as mentioned hereinabove, may even be molded of a synthetic resin.

While the wheel cover 16 illustrated and described herein is of low-cost construction, being formed from a single piece of sheet metal die stamped and die formed to the desired size and shape, it will occur to those skilled in the art that the tooth members could be used with equal facility on a broad range of wheel covers. For example, while the use of four tooth members has been described, six or eight or more may be used to secure a large and heavy wheel cover in position. Similarly, while the illustrated mounting flange 22 is formed integrally with the decorative portions 18 and 20, a separate mounting flange secured to the back side of the wheel cover could be used in the practice of the present invention.

I claim:

1. A wheel cover for multiflanged drop-center automotive wheel, comprising a circular disc shaped to provide around its periphery a generally radially extending annular marginal skirt portion of such radius as to overlie and substantially conceal the marginal portion of the rim of said wheel, and a concentric, generally axially and rearwardly extending, generally cylindrical mounting flange so located as to project within a generally axially, generally cylindrical flange on said rim and of such diameter as to be slightly spaced radially inwardly from such wheel-rim flange, a plurality of tooth members fastened to the outside of said mounting flange at spaced positions around the periphery thereof, each of said tooth members comprising a single, elongated piece of sheet metal centrally bent at a large obtuse angle to provide two generally flat halves with the central portion of each of said halves lying tangentially against said mounting flange and being secured to said mounting flange at each of such points of tangency, the end portions of each of said tooth members being bent to extend generally radially outwardly with the rearward edges of said end portions being forwardly and outwardly inclined and adjoining their forward edges at an acute angle to form sharp-pointed teeth, the points of said teeth on the unmounted wheel cover lying substantially along a common circle of such radius that, when said wheel cover is pressed axially rearwardly onto said wheel, said inclined rearward edges will engage the juncture of said wheel-rim flange and an adjoining, outer, generally radially extending annular surface of said rim, camming said teeth inwardly, resulting in resilient differential flexure of said tooth members and said mounting flange facilitated by the radial spacing between said tooth members and said mounting flange on opposite sides of the points of tangency, the resilience of said tooth members maintaining the sharp points of said teeth in firm, biting engagement with said wheel-rim flange.

2. A wheel cover as described in claim 1 in which the central portions of each of said tooth members intermediate the points of tangency are of reduced width to facilitate resilient flexure of said tooth member.

3. A wheel cover as described in claim 1 in which said points of tangency are firmly secured to said mounting flange by rivets and the sharp points of said teeth are substantially aligned with said rivets along the longitudinal axes of said tooth members, whereby the rearward movement of said wheel cover relative to said wheel and the resulting frictional engagement of said sharp points with said wheel-rim flange causes resilient twisting of the outer portions of said halves.

4. A wheel cover as described in claim 3 in which the rearward edges of said teeth are convexly curved, whereby said twisting leaves said sharp points in engagement with said wheel-rim flange but reduces the contact angle between it and said rearward edges to reduce the friction between them during such rearward movement and facilitate mounting of said wheel cover on said wheel and whereby forward movement of said wheel cover relative to said wheel results in reverse twisting of the outer portions of said halves to increase the contact angle between said wheel-rim flange and said rearward edges and thereby increase the friction between them during such forward movement to resist removal of said wheel cover.

5. A wheel cover as described in claim 4 in which said tooth members are formed of hardened steel and said circular disc is formed of softer material.

6. A wheel cover as described in claim 1 in which said disc is a unitary element formed to provide said skirt and said mounting flange and wherein said tooth members are secured to said mounting flange by rivets, the heads of said rivets at the inside of said mounting flange being exposed at the front side of said wheel cover.

7. A wheel cover as described in claim 6 in which said disc is formed of metal and said rivet heads are finished to have an appearance similar to that of the adjacent portions of the front side of said disc.

8. A wheel cover as described in claim 1 in which said skirt portion includes means which, in the fully mounted position of said wheel cover, axially abuts said wheel rim radially outwardly of said wheel rim flange to maintain said skirt portion in resilient engagement with said wheel rim and thus reduce the tendency of said wheel cover to rattle during driving of the vehicle.

9. A wheel cover as described in claim 8 in which said points of tangency are firmly secured to said mounting flange by rivets and the sharp points of said teeth are substantially aligned with said rivets along the longitudinal axes of said tooth members, whereby the rearward movement of said wheel cover relative to said wheel and the resulting frictional engagement of said sharp points with said wheel-rim flange causes resilient twisting of the outer portions of said halves.

10. A wheel cover as described in claim 9 in which the rearward edges of said teeth are convexly curved, whereby said twisting leaves said sharp points in engagement with said wheel-rim flange but reduces the contact angle between it and said rearward edges to reduce the friction between them during such rearward movement and facilitate mounting of said wheel cover on said wheel and whereby forward movement of said wheel cover relative to said wheel results in reverse twisting of the outer portions of said halves to increase the contact angle between said wheel-rim flange and said rearward edges and thereby increase the friction between them during such forward movement to resist removal of said wheel cover.

11. A wheel cover as described in claim 10 in which said tooth members are formed of hardened steel and said circular disc is formed of softer material.